United States Patent Office 3,795,740
Patented Mar. 5, 1974

3,795,740
METHYLENE DIOXY BENZENE DERIVATIVES AS SYNERGISTS FOR CARBARYL
Don R. Baker, Orinda, and Eugene G. Teach, El Cerrito, Calif., assignors to Stauffer Chemical Company, New York, N.Y.
No Drawing. Continuation-in-part of abandoned application Ser. No. 884,685, Dec. 12, 1969. This application Jan. 20, 1972, Ser. No. 219,547
Int. Cl. A01n 9/28
U.S. Cl. 424—282          14 Claims

ABSTRACT OF THE DISCLOSURE

A composition of matter is described herein which is used as a synergist for carbamate insecticides and methods of use. The composition may be defined by the following generic formula

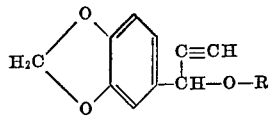

wherein R can be selected from radicals consisting of N-lower alkyl carbamoyl, N-phenyl carbamoyl, N-halogenated phenyl carbamoyl, benzoyl, acetyl, pyranyl and mixtures thereof.

BACKGROUND OF THE INVENTION

Among the many insecticidal compounds, the carbamates have reached a relatively high degree of commercial success. The carbamates are immediately toxic to a large number of insect pests at different concentrations varying with the resistance of the insects mentioned. Some of these compounds are described and claimed in U.S. Pat. 2,903,478 and sold under the trade name SEVIN.

The endeavor to extend the usefulness of the carbamates by increasing their effectiveness and lowering their cost has led to extensive studies on another class of insecticidal material, customarily referred to as synergists. Among the many synergists employed, the alkyl oxides, specifically, piperonyl butoxide, have been widely used. These compounds are described in U.S. Pat. Nos. 2,485,681 and 2,550,737.

While these compositions enhance the usefulness of the carbamates, they do not measure up to the low cost that is desirable along with increased effectiveness.

CROSS REFERENCE TO RELATED APPLICATION

This application is a continuation-in-part of our co-pending application Ser. No. 884,685 filed Dec. 12, 1969, entitled "Synergists" now abandoned.

BRIEF DESCRIPTION OF THE INVENTION

It has been discovered that the carbamate compositions having insecticidal activity can be greatly increased by using a synergist, therefore, having the following formula:

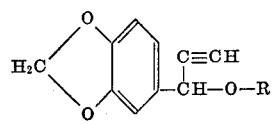

in which R is a radical selected from the group consisting of N-lower alkyl carbamoyl, N-phenyl carbamoyl, N-halogenated phenyl carbamoyl, benzoyl, acetyl and pyranyl. The term "lower alkyl" is defined as an alkyl group having from 1-6 carbon atoms. The term "halogenated" includes chlorine, bromine, iodine and fluorine.

In the practice of the present invention, the synergistic compounds of the present invention are manufactured by reacting 1-propyne alcohol substituted at the 3rd position with certain vinyl ethers, acid chlorides or isocyanates. After the end products are achieved, they are isolated and purified and admixed with the insecticidal compositions. The amount of synergist admixed therewith can range from between about 1 to 0.1 to about 1 to 10 parts carbamates to synergist composition. After the carbamates and synergists are mixed together, they are applied to a habitat in a conventional manner as indicated for use with the carbamates.

In order to illustrate the merits of the present invention, the following examples are provided:

EXAMPLE 1

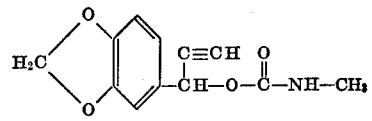

21 grams (0.12 moles) of 3 - (3',4'-methylenedioxyphenyl)propyne-3-ol was dissolved in 100 ml. of acetone containing about 0.1 gram of triethylene diamine and 0.1 g. of dibutyl tin dilaurate. Then, 8.5 g. of methyl isocyanate was added. The mixture was heated at reflux temperature for two hours, cooled and the actone removed by evaporation under vacuum to give 27.5 g. of a solid product having a M.P. of between 75.5 and 77° C.

EXAMPLE 2

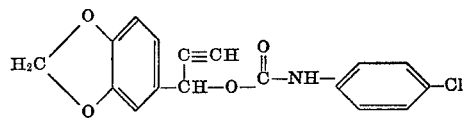

A mixture was formed containing 17.6 grams of 3-(3',4' - methylenedioxyphenyl) - propyne-3-ol (0.10 M), 15.4 g. of p-chlorophenylisocyanate, 40 ml. ether, 1 drop dibutyl tin dilaurate and 1 drop triethylamine. The reaction went to completion exothermically. The mixture was allowed to stand for 16 hours, wherein a small amount of solid was filtered off and discarded. The filtrate was evaporated to yield 27.1 g. of a solid product having a M.P. between 76 and 78° C.

EXAMPLE 3

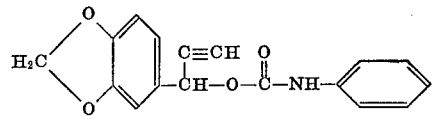

A mixture was formed containing 5.9 grams of 3-(3',4'-methylenedioxyphenyl)-propyne-3-ol (0.033 M), 50 ml. of ether, 4.0 g. of phenyl isocyanate and 1 drop of dibutyl tin dilaurate. The reaction went to completion slightly exothermically (to about 25° C.). The mixture was allowed to stand overnight, wherein a small amount of solid was filtered off and discarded. The filtrate was concentrated in a vacuum to yield 15.6 g. of an oil. $n_D^{30}$ 1.5687.

EXAMPLE 4

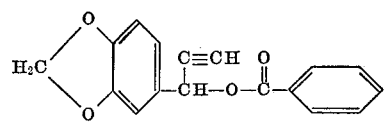

To the mixture of 3-(3',4'-methylenedioxyphenyl)propyne-3-ol (0.033 M), 50 ml. of ether and 4.7 g. of benzoyl chloride was added 4.7 ml. of triethylamine over a period of 5 minutes with slight cooling. The resulting mixture was allowed to stand overnight and the mixture was then washed with water. The ether solution was dried over magnesium sulfate and evaporated in vacuum to yield 7.1 g. of an oil. $n_D^{30}$ 1.5793.

EXAMPLE 5

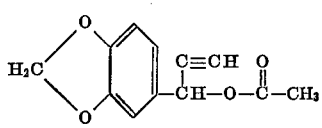

The procedure involved in Example 4 was repeated in its entirety, except 2.50 ml. of acetyl chloride was used in place of the benzoyl chloride. 7.2 g. of an oil was the yield. $n_D^{30}$ 1.5420.

EXAMPLE 6

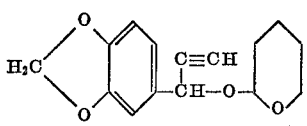

A mixture was formed containing 5.9 g. 3-(3′,4′-methylenedioxyphenyl)-propyne-3-ol, 4.7 g. of dihydropyron, 50 ml. of benzene and 10 mg. of naphthalene sulfonic acid. The temperature was kept at 20–25° by slight cooling. After three hours, 1 teaspoon full of silica gel was added and the mixture filtered. The filtrate was evaporated in vacuum to yield 9.2 g. of an oil.

INSECTICIDAL EVALUATION

I. House fly [*Musca domestica* (L.)]

The following procedure was used to test houseflies. A stock solution containing 100 µg./ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 µg. per Petri dish to that at which 50% mortality was attained. The Petri dishes were placed in a circular cardboard cage, closed on the bottom with cellophane and covered on top with cloth netting. Twenty-five female houseflies were introduced into the cage and the percent mortality was recorded after 48 hours. The $LD_{50}$ values are expressed in terms of µg. per 25 female houseflies. The results of these insecticidal evaluation tests are given in Table I.

II. German cockroach [*Blattella germanica* (Linné)]

Ten one-month-old nymphs are placed into a circular cardboard cage sealed on one end with cellophane and covered by cloth netting on the other. Aliquots of the toxicant, dissolved in acetone, were applied to the abdomen by means of a microsyringe. Test concentrations range from 20 micrograms per roach to that at which 50% mortality is obtained. Percent mortality is recorded after 72 hours and the $LD_{50}$ values are expressed in micrograms per roach in Table II.

III. Black bean aphid [*Aphis fabae* (Scop.)]

Nasturtium (*Tropaeolum* sp.) plants, approximately 2–3 inches tall, are transplanted into sandy loam soil in 3 inch clay pots and infested with 50–75 aphids of mixed ages. Twenty-four hours later they are sprayed, to the point of runoff, with aqueous suspensions of the toxicant. Aliquots of the toxicant, dissolved in an appropriate solvent, are diluted in water to which has been added 0.0002% of a conventional wetting agent such as polyoxyethylene sorbitan monolaurate ether of alkylated phenols blended with organic sulfonate. Test concentrations ranged from 0.05% to that at which 50% mortality is obtained. Mortality is recorded after 48 hours and the $LD_{50}$ values are expressed as percent active ingredient in the aqueous suspensions in Table III.

TABLE I

[Average $LD_{50}$ values, µg. 125 female houseflies]

| Coded compound | Carbaryl[1] | Carbaryl plus— Piperonyl butoxide, 1:5 ratio | Carbaryl plus— Coded compound, 1:5 ratio |
|---|---|---|---|
| Example: | | | |
| I | 100 | 22 | 2.9 |
| II | 100 | 22 | 12.0 |
| III | 100 | 22 | 5.0 |
| IV | 100 | 22 | 11.0 |
| V | 100 | 22 | 16.0 |
| VI | 100 | 22 | 4.2 |

[1] Sold under trade name Sevin.

TABLE II

[Average $LD_{50}$ values, µg./roach]

| Coded compound | Carbaryl[1] | Carbaryl[1] plus coded compound, 1:5 ratio |
|---|---|---|
| Example: | | |
| I | >100 | 20 |
| III | >100 | 15 |
| VI | >100 | 8 |

[1] Sold under trade name Sevin.

TABLE III

[Average $LD_{50}$ values, black bean aphid]

| Coded compound | Carbaryl,[1] percent | Carbaryl[1] plus coded compound, 1:5 ratio |
|---|---|---|
| Example: | | |
| I | 0.0008 | 0.0002 |
| III | 0.0008 | 0.0002 |

[1] Sold under trade name Sevin.

What is claimed is:

1. An insecticidal composition comprising an insecticidal amount of carbaryl and as a synergist therefor a synergistic amount of a compound having the formula

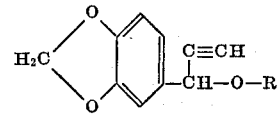

wherein R is a radical selected from the group consisting of N-methyl carbamoyl, N-phenyl carbamoyl, N-p-chlorophenyl carbamoyl, benzoyl, acetyl and pyranyl, and wherein the ratio of carbaryl to synergist is 1 to 5.

2. An insecticidal composition as set forth in claim 1 wherein R is N-methyl carbamoyl.

3. An insecticidal composition as set forth in claim 1 wherein R is N-phenyl carbamoyl.

4. An insecticidal composition as set forth in claim 1 wherein R is N-p-chlorophenyl carbamoyl.

5. An insecticidal composition as set forth in claim 1 wherein R is benzoyl.

6. An insecticidal composition as set forth in claim 1 wherein R is acetyl.

7. An insecticidal composition as set forth in claim 1 wherein R is pyranyl.

8. The method of killing insects comprising applying to the habitat of said insects an insecticidally effective amount of the composition of claim 1.

9. The method of killing insects comprising applying to the habitat of said insects an insecticidally effective amount of the composition of claim 2.

10. The method of killing insects comprising applying to the habitat of said insects an insecticidally effective amount of the composition of claim 3.

11. The method of killing comprising applying to the habitat of said insects an insecticidally effective amount of the composition of claim 4.

12. The method of killing insects comprising applying to the habitat of said insects an insecticidally effective amount of the composition of claim 5.

13. The method of killing insects comprising applying to the habitat of said insects an insecticidally effective amount of the composition of claim 6.

14. The method of killing insects comprising applying to the habitat of said insects an insecticidally effective amount of the composition of claim 7.

References Cited

UNITED STATES PATENTS

| 2,904,465 | 9/1959 | Morefield | 424—282 |
| 2,951,850 | 9/1960 | Hartle et al. | 424—282 |
| 3,423,428 | 1/1969 | Fellig et al. | 424—282 |

ALBERT T. MEYERS, Primary Examiner

V. D. TURNER, Assistant Examiner

U.S. Cl. X.R.

260—340.5; 424—283